G. JACOBS.
TIRE.
APPLICATION FILED OCT. 4, 1920.
1,424,360.
Patented Aug. 1, 1922.
2 SHEETS—SHEET 2.
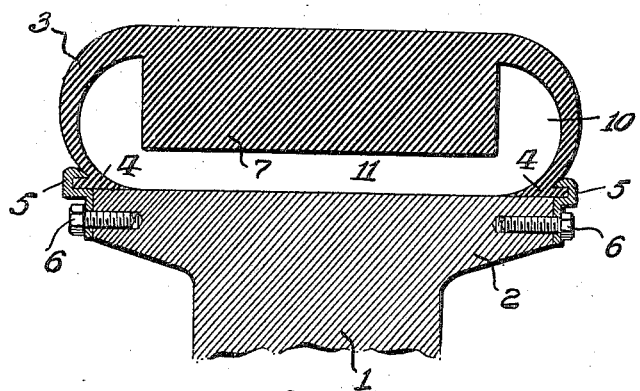
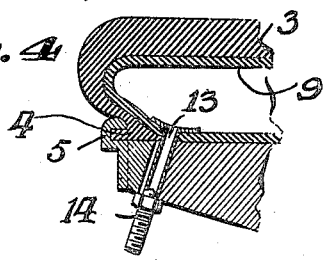
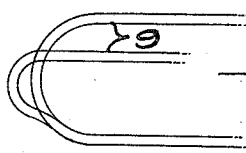
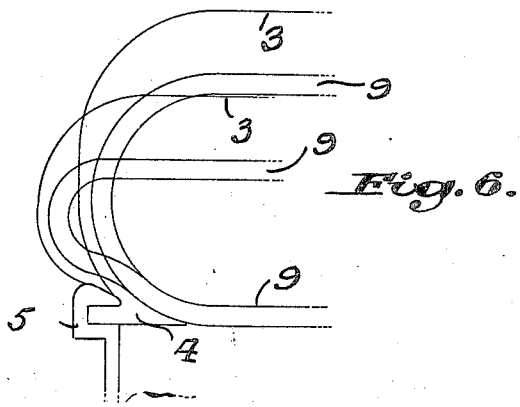
Inventor
George Jacobs,
By
Attorneys

UNITED STATES PATENT OFFICE.

GEORGE JACOBS, OF DETROIT, MICHIGAN.

TIRE.

1,424,360.　　Specification of Letters Patent.　Patented Aug. 1, 1922.

Application filed October 4, 1920. Serial No. 414,407.

*To all whom it may concern:*

Be it known that I, GEORGE JACOBS, a citizen of the United States of America, residing at Detroit, in the county of Wayne and State of Michigan, have invented certain new and useful Improvements in Tires, of which the following is a specification, reference being had therein to the accompanying drawings.

This invention relates to tires, and the primary object of my invention is to dispense with the usual circumferential inner tube of an outer tire casing and provide a series of independent cushion members which may be safely housed within the outer casing of a tire to afford a cushion therefor, the cushion members being disposed and protected by the outer casing so as to reduce to a minimum the possibility of the members bursting due to excessive pressure thereon.

Another object of this invention is to provide an outer tire casing for housing individual cushion members with the casing constructed to afford secondary cushioning members which are automatically brought into action after the primary cushion members have been subjected to a predetermined degree of pressure.

A further object of this invention is to provide a pneumatic tire which will afford a large tread for a wheel and the tire is constructed to shape itself to a surface, for instance on a curved section of road, so as to prevent skidding of a wheel provided with the tire.

The above are a few of the objects which may be attained by my tire and reference will now be had to the preferred form of construction as illustrated in the drawings, wherein—

Fig. 3 is a similar view taken on the line III—III of Fig. 1;

Fig. 4 is a fragmentary sectional view showing a portion of the tire depressed;

Fig. 5 is a diagrammatic view of a portion of one of the cushion members illustrating compression thereof, and Fig. 6 is a similar view illustrating compression of the tire.

Figure 1:
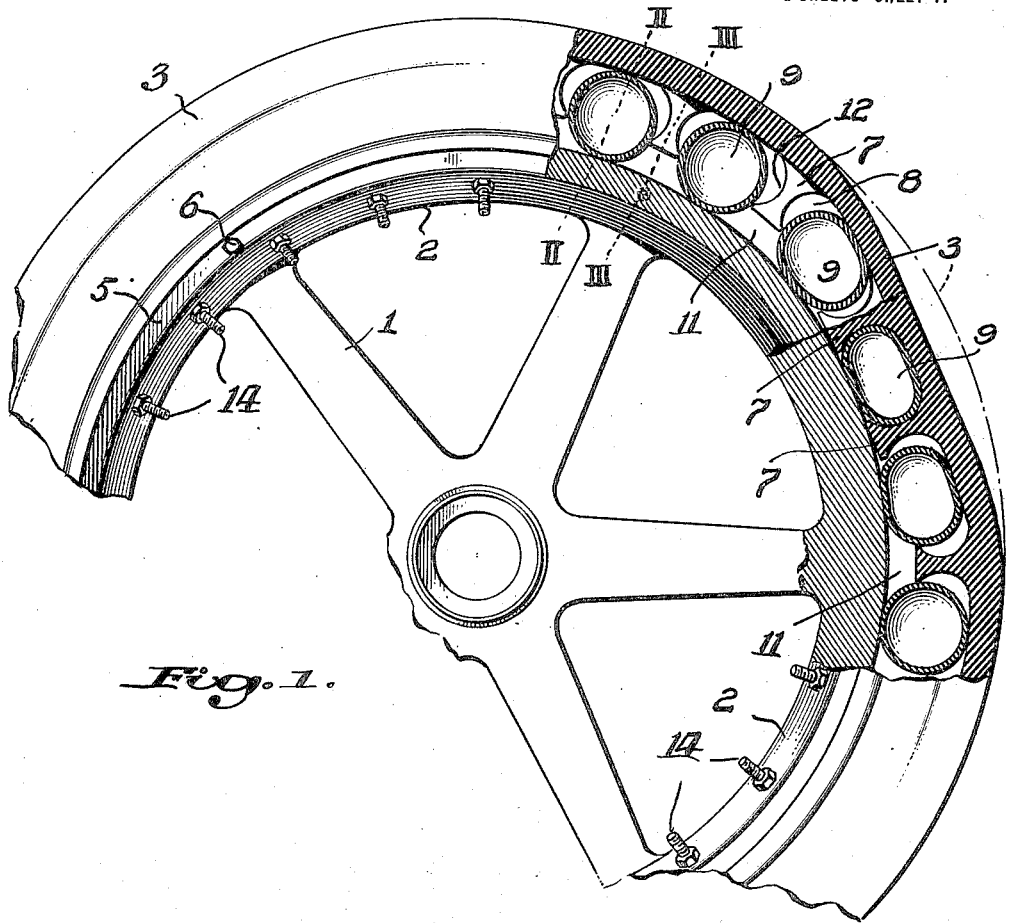
Figure 1 is a side elevation of a portion of a wheel having a tire which is partly broken away, partly in section, and partly depressed.

In the drawing, the reference numeral 1 denotes a wheel body having a rim or felly 2 and mounted on the rim or felly is an outer tire casing 3 which is comparatively flat in contradistinction to the usual tubular or cylindrical tire. The outer casing 3 is oblong in cross section and has clencher edges 4 adapted to be held on the rim 2 by clencher members 5 connected to the side walls of the rim 2 by screw bolts 6 or other fastening means. The clencher edges 4, members 5 and screw bolts 6 represent any suitable means for retaining the outer tire casing on the wheel rim.

The outer tire casing 3 has a comparatively thick tread and the inner wall thereof is formed with transversely disposed integral secondary cushion members 7 which serve functionally as transverse partitions for dividing the casing 3 into a multiplicity of compartments 8 for individual primary cushion members 9. The cushion members 7 are of a less width than the casing 3, as best shown in Fig. 3, so that the ends of the cushion members will be in spaced relation to the side walls of the casing, and thus provide clearance spaces 10 circumferentially of the casing at the ends of the cushion members. The secondary cushion members are also of less depth than the casing 3 so that there will be an intervening space 11 between the cushion members 7 and the rim 2 of the wheel and it is these intervening spaces 11 that permit of the primary cushion members 9 being brought into action in advance of the cushion members 7.

The cushion members 7 have longitudinal concaved walls 12 which provide clearance for the cushion members 9 when compressed or distorted, and with the cushion members 7 bearing on the wheel rim 2 the cushion members 9 are braced and held against excessive compression.

Figure 2:
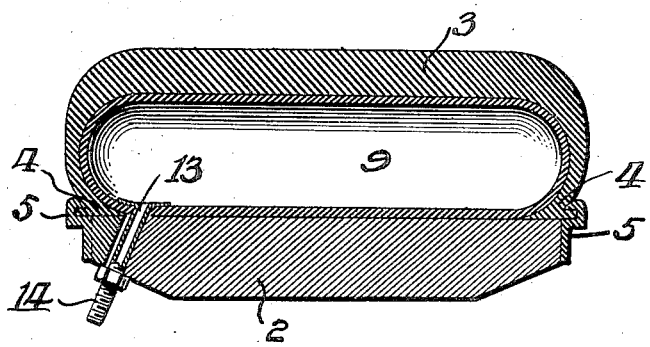
Fig. 2 is an enlarged cross sectional view taken on the line II—II of Fig. 1.

Each cushion member 9 is somewhat "sausage" shaped in elevation and when placed between adjacent cushioning members 7 the tread portion of the casing 3 is supported relative to the wheel rim 2. The ends of each cushion member 9 conform to the side walls of the outer casing 3, as best shown in Fig. 2, and each cushion member is adapted to be inflated or filled through the medium of a filling connection 13 carried by the wheel rim 2 and normally closed by a conventional form of check valve 14. The cushion members 9 may be individually inflated or the filling connections 13 may all be in communication with a common source of air or filling material (not shown).

As illustrated at the depressed portion of the tire, in Fig. 1 and shown diagrammatically in Figs. 5 and 6, the side walls of the outer casing 3 may be distended to extend over the clencher members 5 when the tread or periphery of the tire is depressed, and when this takes place the cushion members 9 are elongated with the ends thereof extending against the side walls of the depressed outer casing 3. Further expansion of the cushion members 9 is possible at the ends thereof, due to the clearance space 10 at the ends of the cushion members 7, but before such expansion takes place the concave walls 12 of the cushion members 7 are engaged by the walls of the cushion members 9 and the cushion members 7 engage the wheel rim 2. For further compression of the cushion members 9 it is necessary to compress the cushion members 7, and it is believed that this degree of compression will be very seldom encountered during the operation of the tire on a wheel.

With the cushion members 7 snugly embracing the walls of the cushion members 9, during compression, it is practically impossible for the cushion members 9 to burst, and should any particular compression member be punctured the inflated members will sustain the load and prevent complete collapse of the outer casing. Even so, should this happen there is still a resilient tire for the wheel, as the cushion members 7 will maintain the outer casing 3 in spaced relation to the wheel rim, and the tire may be used without any danger of rim cuts or injury which would render the outer casing useless.

It is thought that the utility of my invention will be apparent without further description, and while in the drawings there is illustrated a preferred embodiment of my invention, it is to be understood that the structural elements are susceptible to such variations and modifications as fall within the scope of the appended claims.

What I claim is:—

1. In a vehicle wheel, a rim, an outer casing, cushion members on said rim, and secondary cushion members carried by said outer casing between said cushion members on said rim and normally adapted to engage said rim.

2. A wheel comprising a body having a rim, an outer casing having its edges connected to said rim, oblong transversely disposed cushion members in said outer casing on said rim, and means carried by said outer casing normally adapted to engage said rim and prevent excessive compression of said cushion members.

3. In a vehicle wheel, a rim, an outer casing, cushion members on said rim, secondary cushion members carried by said casing and normally adapted to engage the rim between the first mentioned cushion members, said secondary cushion members being of less transverse length than the cushion members on the rim whereby the cushion members on the rim may be expanded at the ends of the secondary cushion members.

In testimony whereof I affix my signature in presence of two witnesses.

GEORGE JACOBS.

Witnesses:
ANNA M. DORR,
KARL H. BUTLER.